(12) United States Patent
Chen et al.

(10) Patent No.: US 12,436,267 B2
(45) Date of Patent: Oct. 7, 2025

(54) ADAPTIVE TRACKING SYSTEM AND TRACKING METHOD FOR WATER SURFACE TARGET

(71) Applicant: Wuhan University of Science and Technology, Wuhan (CN)

(72) Inventors: Yaojie Chen, Wuhan (CN); Haonan Liu, Wuhan (CN); Yunhan Lin, Wuhan (CN); Li Chen, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 72 days.

(21) Appl. No.: 18/921,025

(22) Filed: Oct. 21, 2024

(65) Prior Publication Data
US 2025/0244469 A1    Jul. 31, 2025

(30) Foreign Application Priority Data
Jan. 31, 2024    (CN) .......................... 202410131193.8

(51) Int. Cl.
*G01S 13/86*      (2006.01)
*G01C 13/00*      (2006.01)
(Continued)

(52) U.S. Cl.
CPC .......... *G01S 13/867* (2013.01); *G01C 13/002* (2013.01); *G01P 5/00* (2013.01);
(Continued)

(58) Field of Classification Search
CPC ...... G01S 13/867; G01S 13/917; G01S 13/72; G01C 13/002; G01C 13/004; G01C 13/006; G01P 5/00
(Continued)

(56) References Cited

U.S. PATENT DOCUMENTS 10,055,648 B1 *   8/2018   Grigsby .................. G06F 18/24
11,204,250 B2 *  12/2021   Kim ........................ G06N 20/00
(Continued)

FOREIGN PATENT DOCUMENTS

CN    104850122 A    8/2015
CN    108830879 A   11/2018
(Continued)

OTHER PUBLICATIONS

Lu Daohua, et al., Water surface target tracking based on Kalman filtering and Camshift algorithm, Modern Electronics Technique, 2019, pp. 68-71, vol. 42 No. 11.

*Primary Examiner* — Michael W Justice
(74) *Attorney, Agent, or Firm* — Bayramoglu Law Offices LLC (57) ABSTRACT

An adaptive tracking system and tracking method for a water surface target are provided. The tracking system includes an information acquisition module, a mode selection module for controlling a tracker to enter a tracking mode or a prediction waiting mode, a tracking module for controlling the tracker to track the water surface target, a prediction module for generating a predicted position of the water surface target, and a wake-up module for waking up the tracking module when the water surface target appears at the predicted position. The mode selection unit is introduced, which controls the tracker to enter the prediction waiting mode when the water surface target is occluded or greatly affected by an adverse environmental factor. The design avoids the tracker moving away from the water surface target in a wrong direction, thereby avoiding adverse effects on subsequent tracking of the water surface target.

10 Claims, 3 Drawing Sheets

(51) Int. Cl.
 *G01P 5/00* (2006.01)
 *G01S 13/72* (2006.01)
 *G06T 7/246* (2017.01)

(52) U.S. Cl.
 CPC .............. *G01S 13/72* (2013.01); *G06T 7/248* (2017.01); *G06T 2207/10028* (2013.01); *G06T 2207/10048* (2013.01); *G06T 2207/20004* (2013.01)

(58) Field of Classification Search
 USPC .......................................................... 342/52
 See application file for complete search history.

(56) References Cited

U.S. PATENT DOCUMENTS

| | | | | |
|---|---|---|---|---|
| 11,802,537 | B2* | 10/2023 | O'Donncha | G05B 13/027 |
| 12,084,157 | B2* | 9/2024 | Ishii | G06T 7/246 |
| 2016/0266246 | A1* | 9/2016 | Hjelmstad | G01S 15/86 |
| 2020/0012283 | A1* | 1/2020 | Nguyen | G05D 1/0206 |
| 2020/0160061 | A1* | 5/2020 | Deng | G06T 7/246 |
| 2022/0126959 | A1* | 4/2022 | Ishii | G06T 7/596 |

FOREIGN PATENT DOCUMENTS

| | | |
|---|---|---|
| CN | 112699536 A | 4/2021 |
| CN | 113743385 A | 12/2021 |
| CN | 114972735 A | 8/2022 |
| CN | 117218380 A | 12/2023 |

* cited by examiner

Step S1: acquire, in real time, a visible area $m_t$ of a water surface target, a wind scale $FL_t$, a wave scale $BL_t$, a distance between a tracker and the water surface target, and a velocity magnitude and direction of the water surface target, where t denotes a serial number of different acquisition times, and t=1,2,3,...,n Step S2: send, based on the visible area $m_t$ of the water surface target, the wind scale $FL_t$, and the wave scale $BL_t$, a first signal to proceed to step S3 or a second signal to proceed to step S4

Step S3: control the tracker to track the water surface target based on the distance between the tracker and the water surface target as well as the velocity magnitude and direction of the water surface target Step S4: generate one or more predicted positions of the water surface target based on the distance between the tracker and the water surface target as well as the velocity magnitude and direction of the water surface target Step S5: monitor whether the water surface target appears at the predicted position, and proceed to the step S3 when the water surface target appears at the predicted position

ADAPTIVE TRACKING SYSTEM AND TRACKING METHOD FOR WATER SURFACE TARGET

CROSS REFERENCE TO THE RELATED APPLICATIONS

This application is based upon and claims priority to Chinese Patent Application No. 202410131193.8, filed on Jan. 31, 2024, the entire contents of which are incorporated herein by reference.

TECHNICAL FIELD

The present disclosure relates to the technical field of water surface target tracking, and in particular to an adaptive tracking system and tracking method for a water surface target.

BACKGROUND

Existing water surface target tracking techniques mainly rely on a single or a few sensors to identify and track a target. These systems often lack environmental adaptability and passively respond to environmental changes, resulting in a sharp decline in tracking performance in complex sea conditions, adverse weather conditions, or in case the target is partially occluded. Particularly, when the target is temporarily obscured from view by external objects (such as water vessels, water curtain/mists, and water platforms), traditional systems can hardly quickly reacquire the target.

In the prior art, Chinese patent application CN117218380A provides a dynamic target detection and tracking method based on a remote sensing image acquired by an unmanned surface vehicle (USV). It includes the following steps: a) performing all-weather, multimodal target detection through an adaptive sensor fusion technique integrating radar, optical, and infrared sensors; b) acquiring a spatiotemporal feature of a dynamic target through a deep learning (DL)-based spatiotemporal fusion technique, a three-dimensional convolutional neural network (3D CNN), or a long short-term memory (LSTM); c) training a model for a common maritime scene through an unsupervised anomaly detection technique to identify and track an anomalous target; d) implementing a water surface reflection elimination technique to reduce influences of water surface reflection and solar scintillation; e) applying an adaptive occlusion handling strategy to maintain target tracking through a prediction model, even if the target is occluded by a wave or other objects; f) using a multi-task deep network for object detection, classification, velocity estimation, and direction prediction; and g) implementing an adaptive undulation correction: performing a real-time machine learning (ML)-correction of image deformation caused by a water surface undulation. The prediction model is used to predict the target position so as to reacquire the target position when the target is lost.

However, there are still significant drawbacks in the prior art. For example, the most accurate choice for the water surface tracking techniques is to track the target after acquiring the target position. The predicted position provided by the prediction model only serves as a reference and has a certain error, which is amplified due to adverse external environmental factors (such as strong winds and waves). Therefore, it is not wise to continue tracking according to the predicted position when the target is occluded, and tracking according to the predicted position will deviate further from the actual position of the tracked target.

SUMMARY

In order to solve the problems mentioned in the above background section, an objective of the present disclosure is to provide an adaptive tracking system and tracking method for a water surface target.

In order to achieve the above objective, the present disclosure provides the following technical solutions.

An adaptive tracking system for a water surface target includes:
an information acquisition module, configured to acquire, in real time, a visible area $m_t$ of the water surface target, a wind scale $FL_t$, a wave scale $BL_t$, a distance between a tracker and the water surface target, and a velocity magnitude and direction of the water surface target, where t denotes a serial number of different acquisition times, and t=1, 2, 3, . . . , n;
a mode selection module, configured to send, based on the visible area $m_t$ of the water surface target, the wind scale $FL_t$, and the wave scale $BL_t$, a first signal to control the tracker to enter a tracking mode or a second signal to control the tracker to enter a prediction waiting mode;
a tracking module, configured to receive data on the distance between the tracker and the water surface target as well as the velocity magnitude and direction of the water surface target, and control, upon reception of the first signal, the tracker to track the water surface target based on the distance between the tracker and the water surface target as well as the velocity magnitude and direction of the water surface target;
a prediction module, configured to receive the data on the distance between the tracker and the water surface target as well as the velocity magnitude and direction of the water surface target, and generate, upon reception of the second signal, one or more predicted positions of the water surface target based on the distance between the tracker and the water surface target as well as the velocity magnitude and direction of the water surface target; and
a wake-up module, configured to acquire the predicted position, control the information acquisition module to monitor the predicted position, and send, when the water surface target is detected at the predicted position, a wake-up signal to the tracking module, allowing the tracking module to control the tracker to track the water surface target.

Further, the information acquisition module includes an optical camera, an infrared camera, a pulse Doppler radar, a wind sensor, and a buoy sensor.

Further, the mode selection module includes a data receiving unit, a data processing unit, and a threshold comparison unit, where:
the data receiving unit is electrically connected to the information acquisition module, and is configured to receive the visible area $m_t$ of the water surface target, the wind scale $FL_t$, and the wave scale $BL_t$ transmitted by the information acquisition module;
the data processing unit is electrically connected to the data receiving unit, and is configured to generate a prediction waiting coefficient $YD_t$ based on the visible area $m_t$ of the water surface target, the wind scale $FL_t$, and the wave scale $BL_t$; and specifically:

values are assigned to the wind scale $FL_t$ and the wave scale $BL_t$ respectively by a 1-9 scale method to generate a wind influence value $f(FL_t)$ and a wave influence value $f(BL_t)$;

the prediction waiting coefficient $YD_t$ is calculated according to following equations:

$$\begin{cases} YD1_t = \alpha 1 * \dfrac{m_0 - m_t}{m_0} + \alpha 2 * e^{\frac{m_t - m_{t-1}}{m_0}} \\ YD2_t = \beta 1 * f(FL_t) + \beta 2 * f(BL_t) \\ YD_t = w1 * YD1_t + w2 * \ln(1 + YD2_t) \end{cases}$$

where, in the above calculation equations, $t \geq 2$; and $m_0$ denotes a total area of the water surface target;

$YD1_t$ denotes a first prediction waiting coefficient; $\alpha 1$, $\alpha 2$ denote preset proportional coefficients; $YD2_t$ denotes a second prediction waiting coefficient; $\beta 1$, $\beta 2$ denote preset proportional coefficients; $w1$ denotes a weight influence coefficient of the first prediction waiting coefficient $YD1_t$; and $w2$ denotes a weight influence coefficient of the second prediction waiting coefficient $YD2_t$; and the threshold comparison unit is configured to receive the prediction waiting coefficient $YD_t$, compare the prediction waiting coefficient with a preset threshold TTH, send the first signal to control the tracker to enter the tracking mode when $YD_t < TTH$, and send the second signal to control the tracker to enter the prediction waiting mode when $YD_t \geq TTH$.

Further, an assigning criterion for the wind influence value $f(FL_t)$ is as follows:

when the wind scale $FL_t$ is 0-6, the wind influence value $f(FL_t)$ is assigned a value of 1;

when the wind scale $FL_t$ is 7-10, the wind influence value $f(FL_t)$ is assigned a value of 3;

when the wind scale $FL_t$ is 11-16, the wind influence value $f(FL_t)$ is assigned a value of 5;

when the wind scale $FL_t$ is 17-21, the wind influence value $f(FL_t)$ is assigned a value of 7; and when the wind scale $FL_t$ is 22 or above, the wind influence value $f(FL_t)$ is assigned a value of 9.

Further, an assigning criterion for the wave influence value $f(BL_t)$ is as follows:

when the wave scale $BL_t$ is 0, the wave influence value $f(BL_t)$ is assigned a value of 1;

when the wave scale $BL_t$ is 1, the wave influence value $f(BL_t)$ is assigned a value of 3;

when the wave scale $BL_t$ is 2, the wave influence value $f(BL_t)$ is assigned a value of 5;

when the wave scale $BL_t$ is 3, the wave influence value $f(BL_t)$ is assigned a value of 7; and when the wave scale $BL_t$ is 4 or above, the wave influence value $f(BL_t)$ is assigned a value of 9.

Further, the wake-up module includes a predicted position monitoring unit, an image extraction unit, and an image comparison unit, where:

the predicted position monitoring unit is electrically connected to the prediction module and the information acquisition module, and is configured to receive the one or more predicted positions of the water surface target generated by the prediction module, and control the information acquisition module to monitor the one or more predicted positions of the water surface target predicted by the prediction module;

the image extraction unit is electrically connected to the information acquisition module, and is configured to extract an image acquired by the information acquisition module at the predicted position; and the image comparison unit is electrically connected to the image extraction unit, and is configured to compare the image extracted by the image extraction unit with an image of the water surface target stored in the image comparison unit to determine whether the water surface target appears at the predicted position, and send, when the water surface target appears at the predicted position, the wake-up signal to the tracking module, allowing the tracking module to control, upon reception of the wake-up signal, the tracker to track the water surface target based on the distance between the tracker and the water surface target as well as the velocity magnitude and direction of the water surface target.

An adaptive tracking method for a water surface target is applied to the above adaptive tracking system for a water surface target, and includes the following steps:

S1: acquiring, in real time, the visible area $m_t$ of the water surface target, the wind scale $FL_t$, the wave scale $BL_t$, the distance between the tracker and the water surface target, and the velocity magnitude and direction of the water surface target, where t denotes a serial number of different acquisition times, and $t = 1, 2, 3, \ldots, n$;

S2: sending, based on the visible area $m_t$ of the water surface target, the wind scale $FL_t$, and the wave scale $BL_t$, the first signal to proceed to step S3 or the second signal to proceed to step S4;

S3: controlling the tracker to track the water surface target based on the distance between the tracker and the water surface target as well as the velocity magnitude and direction of the water surface target;

S4: generating the one or more predicted positions of the water surface target based on the distance between the tracker and the water surface target as well as the velocity magnitude and direction of the water surface target; and S5: monitoring whether the water surface target appears at the predicted position, and proceeding to the step S3 when the water surface target appears at the predicted position.

Compared with the prior art, the present disclosure has the following beneficial effects:

The present disclosure provides an adaptive tracking system and tracking method for a water surface target. The present disclosure introduces a mode selection unit, which controls the tracker to enter the prediction waiting mode when the water surface target is occluded or greatly affected by an adverse environmental factor. The design avoids the tracker moving away from the water surface target in a wrong direction, thereby avoiding adverse effects on subsequent tracking of the water surface target. In addition, the present disclosure introduces the wake-up unit, which timely wakes up the tracking module to continue tracking when the water surface target appears at the predicted position, improving the continuity and robustness of water surface target tracking.

DETAILED DESCRIPTION OF THE EMBODIMENTS

In order to make the objectives, technical solutions, and advantages of the present disclosure clearer, the present disclosure is further described in detail below with reference to specific embodiments.

It should be noted that unless otherwise defined, technical or scientific terms used in the present disclosure should have ordinary meanings understood by those of ordinary skill in the art to which the present disclosure belongs. In the present disclosure, terms such as "first" and "second" do not denote any order, quantity or importance, but are merely intended to distinguish between different constituents. "Comprising", "containing", and similar words mean that elements or articles appearing before "comprising" or "containing" include the elements or articles and their equivalent elements appearing behind "comprising" or "containing", not excluding any other elements or articles. Terms such as "connected to" and "connected with" are not restricted to physical or mechanical connections, but may also include electrical connections, whether direct or indirect. "Upper", "lower", "left", "right", and the like are used only to indicate a relative positional relationship, and when the absolute position of the described object is changed, the relative positional relationship is also changed accordingly.

Embodiment 1

As shown in FIGS. 1 to 3, 5, and 6, Embodiment 1 of the present disclosure provides an adaptive tracking system for a water surface target, including the following modules.

Figure 1:
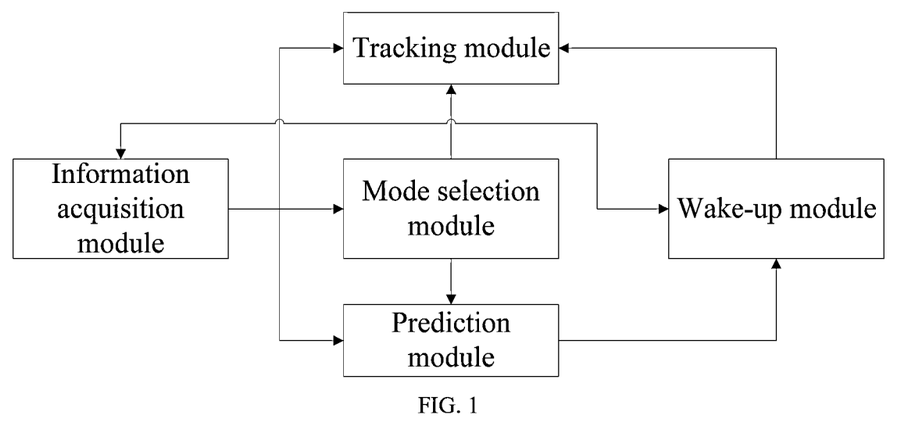
FIG. 1 is a module diagram of an adaptive tracking system for a water surface target according to the present disclosure.

An information acquisition module is configured to acquire, in real time, visible area $m_t$ of the water surface target, wind scale $FL_t$, wave scale $BL_t$, a distance between a tracker and the water surface target, and a velocity magnitude and direction of the water surface target.

It should be noted that t denotes a serial number of different acquisition times, and t=1, 2, 3, . . . , n. The interval between adjacent acquisition times can be 30 seconds, 1 minute, 2 minutes, etc., which are not limited herein.

It should be noted that the information acquisition module includes information acquisition mechanisms such as an optical camera, an infrared camera, a pulse Doppler radar, a wind sensor, and a buoy sensor.

It should be noted that the visible area $m_t$ of the water surface target is acquired through the following method. An optical camera and an infrared camera are used to photograph the water surface target, and an optical image and an infrared image of the water surface target are processed to acquire the visible area $m_t$ of the water surface target. This is a prior art and will not be elaborated herein. Similarly, the wind scale $FL_t$ acquired through a wind sensor, the wave scale $BL_t$ acquired through a buoy sensor, the distance between the tracker and the water surface target acquired through a pulse Doppler radar, and the velocity magnitude and direction of the water surface target all are prior art, which will not be elaborated herein.

It should be noted that the information acquisition module synchronizes timestamps when acquiring various information data, ensuring that the data timeline is consistent and facilitating subsequent data processing.

Figure 2:
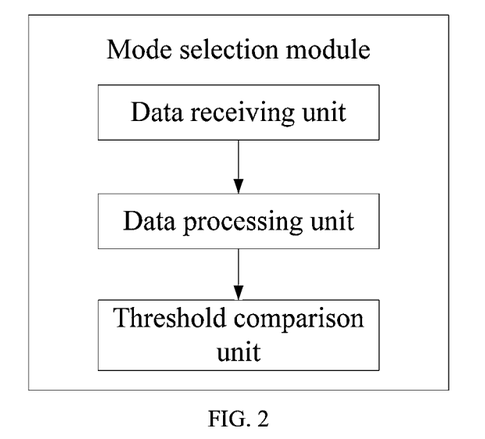
FIG. 2 is a unit diagram of a mode selection module according to the present disclosure.

A mode selection module is electrically connected to the information acquisition module, and is configured to send, based on the visible area $m_t$ of the water surface target, the wind scale $FL_t$, and the wave scale $BL_t$, a first signal to control the tracker to enter a tracking mode or a second signal to control the tracker to enter a prediction waiting mode. Specifically:

The mode selection module includes a data receiving unit, a data processing unit, and a threshold comparison unit.

The data receiving unit is electrically connected to the information acquisition module, and is configured to receive the visible area $m_t$ of the water surface target, the wind scale $FL_t$, and the wave scale $BL_t$ transmitted by the information acquisition module.

The data processing unit is electrically connected to the data receiving unit, and is configured to generate prediction waiting coefficient $YD_t$ based on the visible area $m_t$ of the water surface target, the wind scale $FL_t$, and the wave scale $BL_t$. Specifically:

A value is assigned to the wind scale $FL_t$ by a 1-9 scale method to generate a wind influence value $f(FL_t)$. Specifically:

| Wind scale $FL_t$ | Wind influence value $f(FL_t)$ |
|---|---|
| 0-6 | 1 |
| 7-10 | 3 |
| 11-16 | 5 |
| 17-21 | 7 |
| 22 and above | 9 |

Similarly, a value is assigned to the wave scale $BL_t$ by a 1-9 scale method to generate a wave influence value $f(BL_t)$. Specifically:

| Wave scale $BL_t$ | Wave influence value $f(BL_t)$ |
|---|---|
| 0 | 1 |
| 1 | 3 |
| 2 | 5 |
| 3 | 7 |
| 4 and above | 9 |

The prediction waiting coefficient $YD_t$ is calculated according to following equations:

$$\begin{cases} YD1_t = \alpha1 * \dfrac{m_0 - m_t}{m_0} + \alpha2 * e^{\frac{m_t - m_{t-1}}{m_0}} \\ YD2_t = \beta1 * f(FL_t) + \beta2 * f(BL_t) \\ YD_t = w1 * YD1_t + w2 * \ln(1 + YD2_t) \end{cases}$$

It should be noted that in the above calculation equations, t≥2.

It should be noted that $m_0$ denotes a total area of the water surface target, and the total area $m_0$ of the water surface target can be acquired based on a product parameter of the water surface target.

It should be noted that $YD1_t$ denotes a first prediction waiting coefficient, and α1, α2 denote preset proportional coefficients, α1+α2=1, 0<α2≤α1<1. The specific values of α1, α2 are generally determined by those skilled in the art according to the actual situation.

In an implementation, an optimal range for α1 is 0.5-0.9, and an optimal range for α2 is 0.1-0.5.

Figure 5:
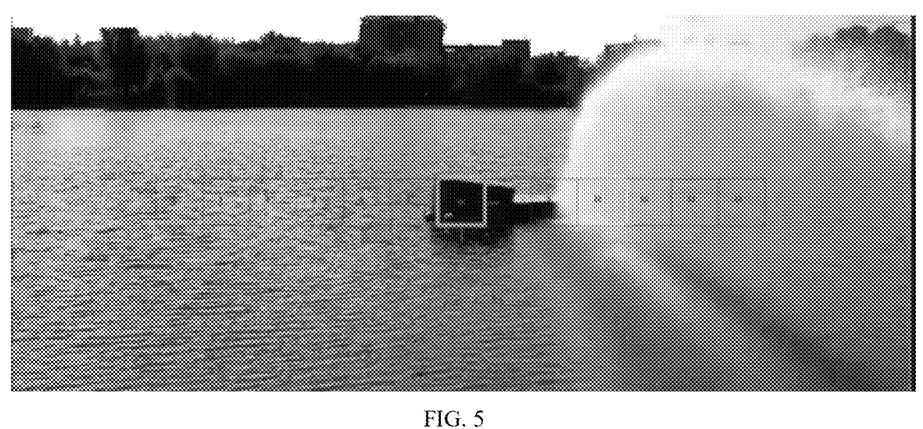
FIG. 5 is a schematic diagram showing that a water surface target is occluded by a water mist.
Figure 6:
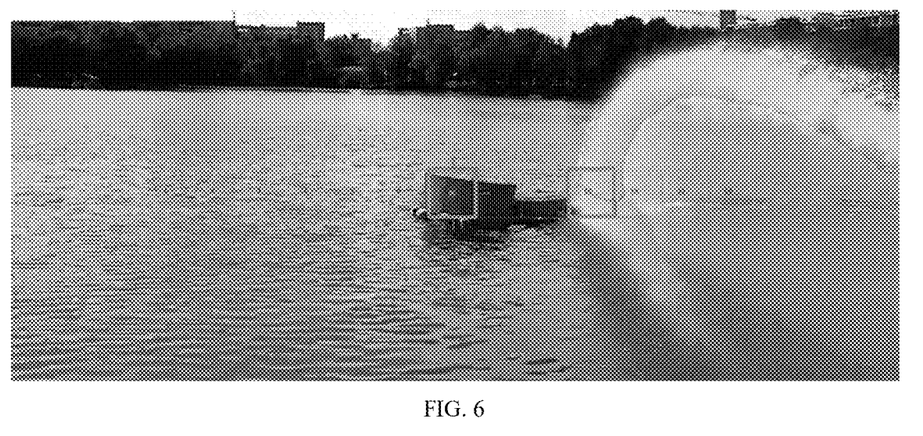
FIG. 6 is a schematic diagram of a specific use of adaptive tracking for a water surface target.

It should be noted that a smaller ratio of the visible area $m_t$ of the water surface target to the total area $m_0$ of the water surface target indicates a smaller observed area of the water surface target, and a larger difficulty to track the water surface target occluded by an external object, such as a water vessel, a water curtain/mist, a water platform (FIG. 5 is a schematic diagram showing that a water surface target is occluded by a water mist). Similarly, a larger difference between the visible area $m_t$ of the water surface target at time t and the visible area $m_{t-1}$ of the water surface target at the previous time (i.e. time t-1) indicates a greater tendency for the water surface target to be occluded, a greater difficulty to track the water surface target in the future due to occlusion, and larger first prediction waiting coefficient $YD1_t$.

It should be noted that $YD2_t$ denotes a second prediction waiting coefficient, and β1, β2 denote preset proportional coefficients, β1+β2=1, 0<β1<β2<1. The specific values of β1, β2 are generally determined by those skilled in the art according to the actual situation.

In an implementation, an optimal range for β1 is 0.2-0.4, and an optimal range for β2 is 0.6-0.8.

It should be noted that higher wind scale $FL_t$ and higher wave scale $BL_t$ respectively indicate greater wind influence value $f(FL_t)$ corresponding to the wind scale $FL_t$ and greater wave influence value $f(BL_t)$ corresponding to the wave scale $BL_t$. They will lead to a harsher external environment in which the water surface target is located, a higher possibility of missing or inaccurate water surface target information acquired due to an adverse weather condition, a higher possibility of deviating from the water surface target when tracking according to the acquired information of the water surface target, and larger second prediction waiting coefficient $YD2_t$.

It should be noted that w1 denotes a weight influence coefficient of the first prediction waiting coefficient $YD1_t$, w2 denotes a weight influence coefficient of the second prediction waiting coefficient $YD2_t$, w1+w2=1, 0<w2≤w1<1. Specific values of w1, w2 are generally determined by those skilled in the art according to the actual situation.

In an implementation, an optimal range for w1 is 0.5-0.8, and an optimal range for w2 is 0.2-0.5.

It should be noted that larger first prediction waiting coefficient $YD1_t$, and larger second prediction waiting coefficient $YD_t$ indicate a higher possibility of deviating from the water surface target due to occlusion or an adverse environmental factor, a larger difficulty to continue tracking the water surface target, and larger the prediction waiting coefficient $YD_t$.

The threshold comparison unit is configured to receive the prediction waiting coefficient $YD_t$ and compare the prediction waiting coefficient with preset threshold TTH. The value of the preset threshold TTH is generally set by staff according to the actual situation on site, and will not be repeated herein. When $YD_t$<TTH, the obstruction and the adverse environmental factor affecting the water surface target is relatively small, and the tracking of the water surface target can be continued. At this point, the first signal is sent to control the tracker to enter the tracking mode. When $YD_t$≥TTH, the obstruction and the adverse environmental factor that affects the surface target is large, indicating a high possibility of tracking deviation and a great difficulty to continue tracking the surface target. At this point, the second signal is sent to control the tracker to enter the prediction waiting mode. The tracker in the prediction waiting mode stays on the water surface. The design avoids the tracker moving away from the water surface target in a wrong direction, thereby avoiding an adverse effect on subsequent tracking of the water surface target.

A tracking module is electrically connected to the information acquisition module and the threshold comparison unit of the mode selection module, and is configured to receive data on the distance between the tracker and the water surface target as well as the velocity magnitude and direction of the water surface target, and control, upon reception of the first signal, the tracker to track the water surface target based on the distance between the tracker and the water surface target as well as the velocity magnitude and direction of the water surface target.

It should be noted that the tracking module includes a tracking path processor and a driving mechanism that operates under the control of the tracking path processor. The tracking path processor is electrically connected to the information acquisition unit and the threshold comparison unit of the mode selection module, and is configured to process the data on the distance between the tracker and the water surface target as well as the velocity magnitude and direction of the water surface target upon reception of the first signal so as to generate a tracking path. The tracking path is input into the driving mechanism, and the driving mechanism drives the tracker to track the water surface target. The driving mechanism can be a water-borne driving mechanism such as a propeller.

It should be noted that it is a prior art that the tracking module controls the tracker to track the water surface target based on the data on the distance between the tracker and the water surface target as well as the velocity magnitude and direction of the water surface target. First, the data are preprocessed, then the tracking path is calculated through a conventional algorithm, and finally the tracking path is input into the driving mechanism to track the water surface target. The data preprocessing is implemented by filtering the optical image, the infrared image, and the radar data through a Gaussian filters to eliminate noise, enhancing data according to a contrast enhancement equation, extracting an image feature through a deep learning (DL)-based convolutional neural network (CNN), extracting a radar data velocity according to a Fourier transform equation, and combining optical image data, infrared image data, and radar data through a weighted fusion algorithm to form a comprehensive cognitive index of the target. These preprocessing means will not be elaborated herein.

A prediction module is electrically connected to an information acquisition module and a threshold comparison unit of a mode selection module, and is, configured to receive the data on the distance between the tracker and the water surface target as well as the velocity magnitude and direction of the water surface target, and generate, upon reception of the second signal, one or more predicted positions of the water surface target based on the distance between the tracker and the water surface target as well as the velocity magnitude and direction of the water surface target.

It should be noted that the prediction module generates multiple predicted positions of the water surface target based on data on the distance between the tracker and the water surface target, the velocity magnitude and direction of the water surface target, etc. This is a prior art. For example, first, the data is preprocessed (preprocessing operations can be the same as those in the tracking module), then, a basic motion model is created based on a known target type, and the real-time data such as the distance between the tracker and the water surface target and the velocity magnitude and direction of the water surface target are input into the motion model to acquire one or more predicted positions of the water surface target. Of course, the solution mentioned in the background section can also be adopted, which is not limited herein.

A wake-up module is electrically connected to the information acquisition module, the tracking module, and the prediction module, and is configured to acquire the predicted position, control the information acquisition module to monitor the predicted position, and send, when the water surface target is detected at the predicted position, a wake-up signal to the tracking module, allowing the tracking module to control the tracker to track the water surface target.

Figure 3:
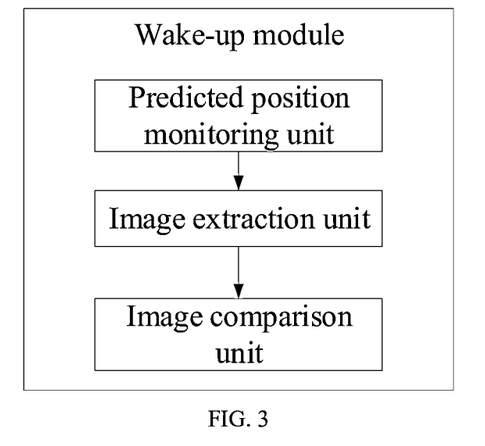
FIG. 3 is a unit diagram of a wake-up module according to the present disclosure.

The wake-up module includes a predicted position monitoring unit, an image extraction unit, and an image comparison unit.

The predicted position monitoring unit is electrically connected to the prediction module and the information acquisition module, and is configured to receive the one or more predicted positions of the water surface target generated by the prediction module, and control the information acquisition module to monitor the one or more predicted positions of the water surface target predicted by the prediction module.

The image extraction unit is electrically connected to the information acquisition module, and is configured to extract an image acquired by the information acquisition module at the predicted position.

The image comparison unit is electrically connected to the image extraction unit, and is configured to compare the image extracted by the image extraction unit with an image of the water surface target stored in the image comparison unit to determine whether the water surface target appears at the predicted position, and send, when the water surface target appears at the predicted position, the wake-up signal to the tracking module, allowing the tracking module to control, upon reception of the wake-up signal, the tracker to track the water surface target based on the distance between the tracker and the water surface target as well as the velocity magnitude and direction of the water surface target.

It should be noted that the image comparison unit can be an existing image recognizer. The recognition logic of the image recognizer is as follows. Feature points of the image extracted by the image extraction unit are compared with those of the image of the water surface target stored in the image comparison unit. When the feature point matching degree reaches a certain threshold, it is determined that the water surface target appears at the predicted position. This is a prior art and will not be elaborated herein.

Further, the predicted position monitoring unit includes an adjustment processor and displacement flipping mechanisms that operate under the control of the adjustment processor. An optical camera, an infrared camera, a pulse Doppler radar, a wind sensor, and a buoy sensor of the information acquisition module are respectively provided with the displacement flipping mechanisms. The adjustment processor is electrically connected to the prediction module, and is configured to control the displacement flipping mechanism based on the predicted position of the water surface target, such that each information acquisition mechanism of the information acquisition module moves and flips under the driving of the displacement flipping mechanism to align with the predicted position. The design avoids the problem of the information acquisition module being unable to acquire image data at the predicted location.

Embodiment 2

Figure 4:
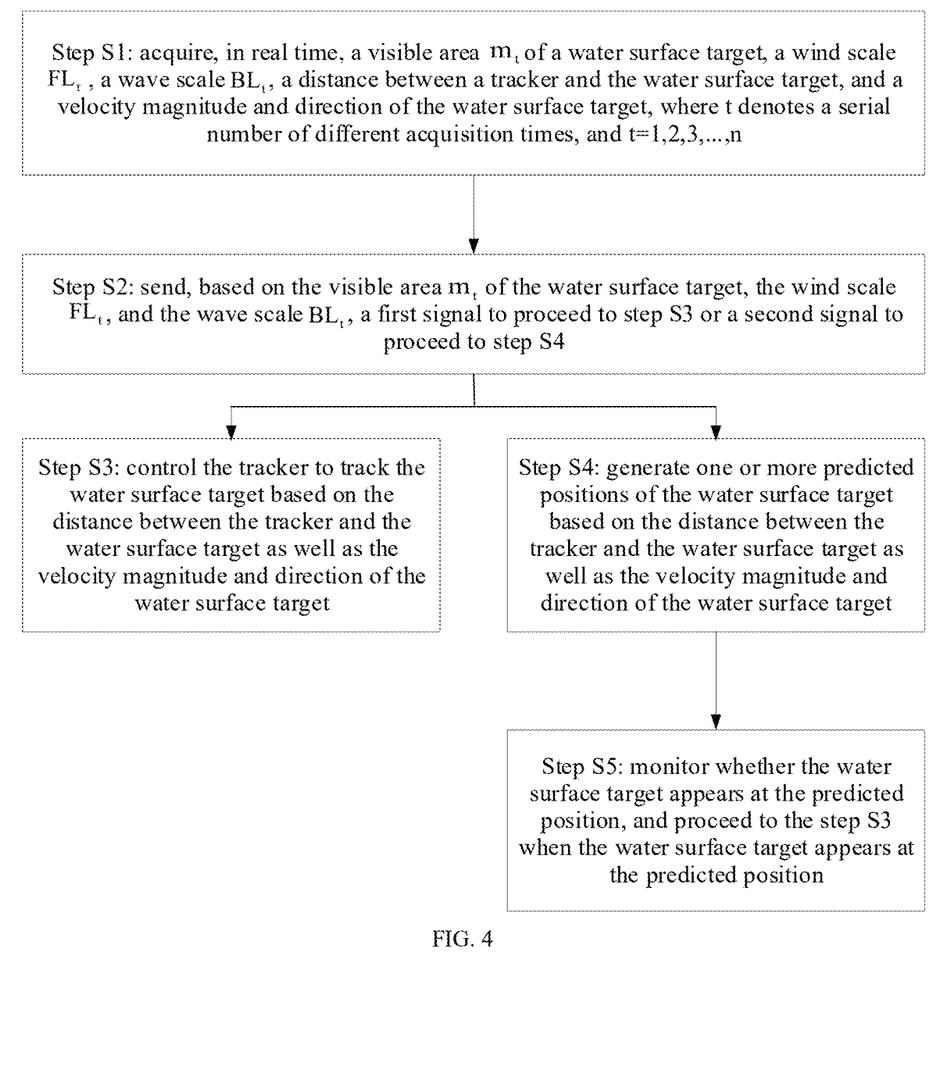
FIG. 4 is a flowchart of an adaptive tracking method for a water surface target according to the present disclosure.

As shown in FIG. 4, the embodiment of the present disclosure provides an adaptive tracking method for a water surface target, which is applied to the above adaptive tracking system for a water surface target, and includes the following steps.

S1. The visible area $m_t$ of the water surface target, the wind scale $FL_t$, the wave scale $BL_t$, the distance between the tracker and the water surface target, and the velocity magnitude and direction of the water surface target are acquired in real time, where t denotes a serial number of different acquisition times, and t=1, 2, 3, . . . , n.

S2. Based on the visible area $m_t$ of the water surface target, the wind scale $FL_t$, and the wave scale $BL_t$ the first signal is sent to proceed to step S3 or the second signal is sent to proceed to step S4.

S3. The tracker is controlled to track the water surface target based on the distance between the tracker and the water surface target as well as the velocity magnitude and direction of the water surface target.

S4. The one or more predicted positions of the water surface target are generated based on the distance between the tracker and the water surface target as well as the velocity magnitude and direction of the water surface target.

S5. Whether the water surface target appears at the predicted position is monitored, and the method proceeds to the step S3 when the water surface target appears at the predicted position.

The above equations involve dimensionless numerical calculations. They are obtained through software simulation by a large amount of data and are the closest to the real situation. The preset parameters in the equations are set by those skilled in the art according to the actual situation.

The above embodiments can be implemented fully or partially by software, hardware, firmware, or any combination thereof. When software is used for implementation, the embodiment can be performed in form of a computer program product in whole or in part. Those skilled in the art may be aware that units and algorithm steps in examples described with reference to the embodiments disclosed herein can be implemented by means of electronic hardware or a combination of computer software and electronic hardware. Whether these functions are implemented by means of hardware or software depends on the specific application of the technical solutions and design constraints.

The units described as separate parts may be or may not be physically separate, and parts displayed as units may be or may not be physical units. That is, they may be located in one position, or may be distributed on a plurality of network units. Some or all of the units may be selected according to actual needs to achieve the objectives of the solutions of embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An adaptive tracking system for a water surface target, comprising:
an information acquisition module comprising at least one sensor, configured to acquire, in real time, a visible area $m_t$ of the water surface target, a wind scale $FL_t$, a wave scale $BL_t$, a distance between a tracker and the water surface target, and a velocity magnitude and direction of the water surface target, wherein t denotes a serial number of different acquisition times, and t=1, 2, 3, . . . , n;

a mode selection module comprising at least one processor, configured to send, based on the visible area $m_t$ of the water surface target, the wind scale $FL_t$, and the wave scale $BL_t$, a first signal to control the tracker to enter a tracking mode or a second signal to control the tracker to enter a prediction waiting mode;

a tracking module comprising at least one processor, configured to receive data on the distance between the tracker and the water surface target as well as the velocity magnitude and direction of the water surface target, and control, upon a reception of the first signal, the tracker to track the water surface target based on the distance between the tracker and the water surface target as well as the velocity magnitude and direction of the water surface target;

a prediction module comprising at least one processor, configured to receive the data on the distance between the tracker and the water surface target as well as the velocity magnitude and direction of the water surface target, and generate, upon a reception of the second signal, at least one predicted position of the water surface target based on the distance between the tracker and the water surface target as well as the velocity magnitude and direction of the water surface target; and a wake-up module comprising at least one processor, configured to acquire the predicted position, control the information acquisition module to monitor the predicted position, and send, when the water surface target is detected at the predicted position, a wake-up signal to the tracking module, allowing the tracking module to control the tracker to track the water surface target;

wherein the mode selection module comprises a data receiving unit, a data processing unit, and a threshold comparison unit, wherein the data receiving unit is electrically connected to the information acquisition module, and is configured to receive the visible area $m_t$ of the water surface target, the wind scale $FL_t$, and the wave scale $BL_t$ transmitted by the information acquisition module;

the data processing unit is electrically connected to the data receiving unit, and is configured to generate a prediction waiting coefficient $YD_t$ based on the visible area $m_t$ of the water surface target, the wind scale $FL_t$, and the wave scale $BL_t$; wherein values are assigned to the wind scale $FL_t$ and the wave scale $BL_t$ respectively by a 1-9 scale method to generate a wind influence value $f(FL_t)$ and a wave influence value $f(BL_t)$;

the prediction waiting coefficient $YD_t$ is calculated according to the following equations:

$$\begin{cases} YD1_t = \alpha 1 * \dfrac{m_0 - m_t}{m_0} + \alpha 2 * e^{\frac{m_t - m_{t-1}}{m_0}} \\ YD2_t = \beta 1 * f(FL_t) + \beta 2 * f(BL_t) \\ YD_t = w1 * YD1_t + w2 * \ln(1 + YD2_t) \end{cases}$$

wherein in the equations, t≥2; and $m_0$ denotes a total area of the water surface target;

$YD1_t$ denotes a first prediction waiting coefficient; α1, α2 denote first preset proportional coefficients; $YD2_t$ denotes a second prediction waiting coefficient; β1, β2 denote second preset proportional coefficients; w1 denotes a weight influence coefficient of the first prediction waiting coefficient $YD1_t$; and w2 denotes a weight influence coefficient of the second prediction waiting coefficient $YD2_t$;

the threshold comparison unit is configured to receive the prediction waiting coefficient $YD_t$, compare the prediction waiting coefficient $YD_t$ with a preset threshold TTH, send the first signal to control the tracker to enter the tracking mode when $YD_t<TTH$, and send the second signal to control the tracker to enter the prediction waiting mode when $YD_t \geq TTH$; and the visible area $m_t$ of the water surface target is acquired by: photographing the water surface target through an optical camera and an infrared camera, and processing an optical image and an infrared image of the water surface target to acquire the visible area $m_t$ of the water surface target.

2. The adaptive tracking system for the water surface target according to claim 1, wherein the at least one sensor of the information acquisition module comprises the optical camera, the infrared camera, a pulse Doppler radar, a wind sensor, and a buoy sensor.

3. The adaptive tracking system for the water surface target according to claim 1, wherein an assigning criterion for the wind influence value $f(FL_t)$ is as follows:

when the wind scale $FL_t$ is 0-6, the wind influence value $f(FL_t)$ is assigned a value of 1;

when the wind scale $FL_t$ is 7-10, the wind influence value $f(FL_t)$ is assigned a value of 3;

when the wind scale $FL_t$ is 11-16, the wind influence value $f(FL_t)$ is assigned a value of 5;

when the wind scale $FL_t$ is 17-21, the wind influence value $f(FL_t)$ is assigned a value of 7; and when the wind scale $FL_t$ is 22 or above, the wind influence value $f(FL_t)$ is assigned a value of 9.

4. The adaptive tracking system for the water surface target according to claim 1, wherein an assigning criterion for the wave influence value $f(BL_t)$ is as follows:

when the wave scale $BL_t$ is 0, the wave influence value $f(BL_t)$ is assigned a value of 1;

when the wave scale $BL_t$ is 1, the wave influence value $f(BL_t)$ is assigned a value of 3;

when the wave scale $BL_t$ is 2, the wave influence value $f(BL_t)$ is assigned a value of 5;

when the wave scale $BL_t$ is 3, the wave influence value $f(BL_t)$ is assigned a value of 7; and when the wave scale $BL_t$ is 4 or above, the wave influence value $f(BL_t)$ is assigned a value of 9.

5. The adaptive tracking system for the water surface target according to claim 1, wherein the wake-up module comprises a predicted position monitoring unit, an image extraction unit, and an image comparison unit, wherein the predicted position monitoring unit is electrically connected to the prediction module and the information acquisition module, and is configured to receive the at least one predicted position of the water surface target generated by the prediction module, and control the information acquisition module to monitor the at least one predicted position of the water surface target predicted by the prediction module;

the image extraction unit is electrically connected to the information acquisition module, and is configured to extract an image acquired by the information acquisition module at the predicted position; and the image comparison unit is electrically connected to the image extraction unit, and is configured to compare the image extracted by the image extraction unit with an image of the water surface target stored in the image comparison unit to determine whether the water surface target appears at the predicted position, and send, when the water surface target appears at the predicted position, the wake-up signal to the tracking module, allowing the tracking module to control, upon a reception of the wake-up signal, the tracker to track the water surface target based on the distance between the tracker and the water surface target as well as the velocity magnitude and direction of the water surface target.

6. An adaptive tracking method for a water surface target, applied to the adaptive tracking system for the water surface target according to claim 1, and comprising the following steps:

S1: acquiring, in real time, the visible area $m_t$ of the water surface target, the wind scale $FL_t$, the wave scale $BL_t$, the distance between the tracker and the water surface target, and the velocity magnitude and direction of the water surface target, wherein t denotes the serial number of different acquisition times, and t=1, 2, 3, ..., n;

S2: sending, based on the visible area $m_t$ of the water surface target, the wind scale $FL_t$, and the wave scale $BL_t$, the first signal to proceed to step S3 or the second signal to proceed to step S4;

S3: controlling the tracker to track the water surface target based on the distance between the tracker and the water surface target as well as the velocity magnitude and direction of the water surface target;

S4: generating the at least one predicted position of the water surface target based on the distance between the tracker and the water surface target as well as the velocity magnitude and direction of the water surface target; and S5: monitoring whether the water surface target appears at the predicted position, and proceeding to the step S3 when the water surface target appears at the predicted position.

7. The adaptive tracking method according to claim 6, wherein in the the adaptive tracking system for the water surface target, the information acquisition module comprises the optical camera, the infrared camera, a pulse Doppler radar, a wind sensor, and a buoy sensor.

8. The adaptive tracking method according to claim 6, wherein in the the adaptive tracking system for the water surface target, an assigning criterion for the wind influence value $f(FL_t)$ is as follows:

when the wind scale $FL_t$ is 0-6, the wind influence value $f(FL_t)$ is assigned a value of 1;
when the wind scale $FL_t$ is 7-10, the wind influence value $f(FL_t)$ is assigned a value of 3;
when the wind scale $FL_t$ is 11-16, the wind influence value $f(FL_t)$ is assigned a value of 5;
when the wind scale $FL_t$ is 17-21, the wind influence value $f(FL_t)$ is assigned a value of 7; and
when the wind scale $FL_t$ is 22 or above, the wind influence value $f(FL_t)$ is assigned a value of 9.

9. The adaptive tracking method according to claim 6, wherein in the the adaptive tracking system for the water surface target, an assigning criterion for the wave influence value $f(BL_t)$ is as follows:

when the wave scale $BL_t$ is 0, the wave influence value $f(BL_t)$ is assigned a value of 1;
when the wave scale $BL_t$ is 1, the wave influence value $f(BL_t)$ is assigned a value of 3;
when the wave scale $BL_t$ is 2, the wave influence value $f(BL_t)$ is assigned a value of 5;
when the wave scale $BL_t$ is 3, the wave influence value $f(BL_t)$ is assigned a value of 7; and
when the wave scale $BL_t$ is 4 or above, the wave influence value $f(BL_t)$ is assigned a value of 9.

10. The adaptive tracking method according to claim 6, wherein in the the adaptive tracking system for the water surface target, the wake-up module comprises a predicted position monitoring unit, an image extraction unit, and an image comparison unit, wherein the predicted position monitoring unit is electrically connected to the prediction module and the information acquisition module, and is configured to receive the at least one predicted position of the water surface target generated by the prediction module, and control the information acquisition module to monitor the at least one predicted position of the water surface target predicted by the prediction module;

the image extraction unit is electrically connected to the information acquisition module, and is configured to extract an image acquired by the information acquisition module at the predicted position; and the image comparison unit is electrically connected to the image extraction unit, and is configured to compare the image extracted by the image extraction unit with an image of the water surface target stored in the image comparison unit to determine whether the water surface target appears at the predicted position, and send, when the water surface target appears at the predicted position, the wake-up signal to the tracking module, allowing the tracking module to control, upon a reception of the wake-up signal, the tracker to track the water surface target based on the distance between the tracker and the water surface target as well as the velocity magnitude and direction of the water surface target.

* * * * *